United States Patent
Chavez, Jr. et al.

(10) Patent No.: US 6,603,844 B1
(45) Date of Patent: Aug. 5, 2003

(54) ADVERTISED RING BACK IN A TELECOMMUNICATION SWITCHING SYSTEM

(75) Inventors: David L. Chavez, Jr., Thornton, CO (US); Stephen M. Thieler, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/387,161

(22) Filed: Aug. 31, 1999

(51) Int. Cl.[7] .................. H04M 1/64; H04M 15/00; H04M 3/00
(52) U.S. Cl. .............. 379/114.13; 379/67.1; 379/76; 379/88.13; 379/88.17; 379/114.1; 379/265.09
(58) Field of Search ............. 379/67.1, 69, 70, 379/76, 88.13, 88.17, 88.18, 93.12, 93.13, 93.24, 265, 266, 114.11, 114.12, 114.13, 114.1, 114.18, 900, 265.09, 88.19; 370/352, 356; 704/270, 271, 275

(56) References Cited

U.S. PATENT DOCUMENTS

| | | | |
|---|---|---|---|
| 4,811,382 A | | 3/1989 | Sleevi |
| 4,850,007 A | * | 7/1989 | Marino et al. ............. 379/67.1 |
| 5,003,584 A | | 3/1991 | Benyacar et al. ........... 379/119 |
| 5,278,889 A | | 1/1994 | Papanicolaou et al. ....... 379/53 |
| 5,333,186 A | | 7/1994 | Gupta ........................ 379/201 |
| 5,448,625 A | * | 9/1995 | Lederman ................. 379/67.1 |
| 5,473,630 A | | 12/1995 | Penzias et al. ............... 375/114 |
| 5,555,299 A | * | 9/1996 | Maloney et al. ............ 379/212 |
| 5,557,658 A | * | 9/1996 | Gregorek et al. .......... 379/67.1 |
| 5,572,643 A | * | 11/1996 | Judson ........................ 395/793 |
| 5,726,909 A | * | 3/1998 | Krikorian ................ 364/514 R |
| 5,884,032 A | * | 3/1999 | Bateman et al. ........ 395/200.34 |
| 5,884,262 A | * | 3/1999 | Wise et al. .................. 704/270 |
| 5,930,343 A | | 7/1999 | Vasquez ..................... 379/115 |
| 5,970,124 A | * | 10/1999 | Csaszar et al. .......... 379/88.18 |
| 5,991,394 A | * | 11/1999 | Dezonno et al. ............ 379/265 |
| 6,018,710 A | * | 1/2000 | Wynblatt et al. ........... 704/260 |
| 6,052,438 A | * | 4/2000 | Wu et al. .................. 379/67.1 |
| 6,424,646 B1 | * | 7/2002 | Gerszberg et al. .......... 370/352 |

FOREIGN PATENT DOCUMENTS

| | | |
|---|---|---|
| GB | 2 316 268 A | 2/1998 |
| JP | 0051357 | 3/1985 |
| WO | WO 93/00763 | 1/1993 |

* cited by examiner

*Primary Examiner*—Allan Hoosain
(74) *Attorney, Agent, or Firm*—John C. Moran

(57) ABSTRACT

Transmitting by a public service provider an audio message to the calling party instead normal ring back tones when a call is placed by a calling party to a called party. This audio message is an advertisement that is paid for by a third party. If the calling party wishes more information concerning the advertisement, the calling party indicates this desire either by a spoken command or by accuation of a multi-frequency key on the telephone hand set during the message. If the calling party has indicated a desire to obtain more information with respect to the advertisement, when the call to the called party is completed, the public service provider will automatically connect the calling party to a system that will provide additional information concerning the advertisement. A data terminal placing a data call will receive advertisements in a similar manner.

11 Claims, 4 Drawing Sheets

US 6,603,844 B1

ADVERTISED RING BACK IN A TELECOMMUNICATION SWITCHING SYSTEM

TECHNICAL FIELD

This invention relates to telecommunication switching, and, in particular, to the provision of paid advertisements during ring back period to the call originator.

BACKGROUND OF THE INVENTION

In the current public service provider local market, extreme pressure exists on maximizing revenue to offset costs associated with providing satisfactory customer service. Within the prior art, local public service providers have attempted to maximize their revenue by offering a variety of expensive service features to the users. These features include voice messaging, caller ID, etc. for which the user pays a fixed amount per month. However, such features that are paid for by the users have not generated sufficient revenue to upgrade standard service provided to the customers. The local public service providers (such as the Regional Bell Operating Companies) have also requested that they be allowed to enter the long distance market. However, because of government regulations and requirements, the local public service providers have not made sufficient in roads into the long distance market. The local public service providers need a new source of revenue and one that does not require that their customers directly pay for this new source of revenue.

Within the prior art, it is known for long distance service providers, such as AT&T, to provide an identification announcement during a call set up to reassure the call originator that they are using the long distance service provider that they wish to use. In addition, some long distance service providers also provide a notification of the time of day for the region of the called party. This information is provided so that the call originator can be aware of the time of day at the location they are calling. In addition, some local public service providers and long distance service providers provide an option upon the called telephone being busy for the call originator to select certain features. This is done by listing the features to the call originator as an audio message when it is determined that the called telephone is busy.

The aforementioned utilization of the time during which the call is being set up or when a busy called terminal is discovered do not generate additional revenue for the public service provider if the customer chooses not to select the feature.

SUMMARY OF THE INVENTION

This invention is directing to solving these and other problems and shortcomings of the prior art. Illustratively according to the invention, when a call is placed by a calling party to a called party, during the time that the calling party would normally hear the ring back tones, a public service provider transmits instead an, audio message to the calling party. This audio message is an advertisement that is paid for by a third party. If the calling party wishes more information concerning the advertisement, the calling party indicates this desire either by a spoken command or by actuation of a multi-frequency key on the telephone hand set during the message. If the calling party has indicated a desire to obtain more information with respect to the advertisement, when the call to the called party is completed, the public service provider will automatically connect the calling party to a system that will provide additional audio information concerning the advertisement. Advantageously, the public service provider will connect the calling party to the system designated by the company placing the advertisement. A data terminal placing a data call will receive advertisements in a similar manner.

Advantageously, the public service provider provides the service via a local central office telephone switching system. The customers connected to the local central office may be grouped into a plurality of classes with each class being based on the social demographics of the customer plus other criteria. Advantageously, each customer may be considered as an individual and the advertisements are placed on the basis of an individual or a group based on the desires of the advertisers. For example, older couples tend to eat out more frequently than couples with young children. Hence, the central office would direct advertisements for finer restaurants to the older couples and advertisements for fast foods (specializing in children) to the younger couples. If the customers were divided into classes for the purpose of directing advertisements to these customers, a large number of classes could be created. For a particular advertisement, the advertisement could be directed to more than one class. The identification of the customers by social demographics and other criteria allows advertisers to pin point the audience to which their advertisements will go. Advantageously, the service provider could collect additional information if a customer indicates during the playing of the advertisement that they wish additional information from the advertiser. The ability of an advertiser to pin point the recipients of their advertisements so precisely will make the capability extremely valuable for advertisers. Advantageously, different advertisements will be directed to the same class or individual depending on the time of day and the desires of the advertisers.

Not only can advertisements be supplied by the public service provider via a telephone but a data terminal attempting to establish data service would have data messages defining the advertisement sent to the data terminal while the data terminal is attempting to log on to a data system via the central office. In addition, advertisements could be sent to data terminals for personal computers when the terminal is attempting to gain Internet access via a switching system other than a telephone switching system such as a service provider providing Internet access via a cable system.

These and other features and advantages of the present invention will become apparent from the following description of illustrative embodiments of the invention considered together with the drawing.

DETAILED DESCRIPTION

Figure 1:
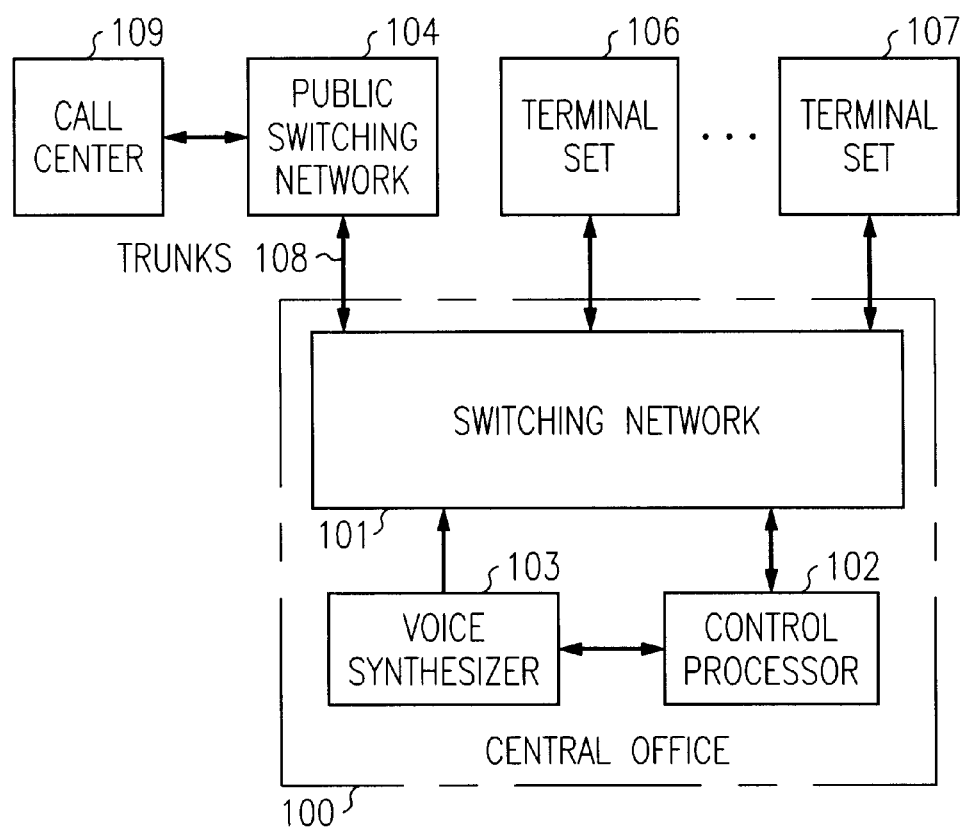
FIG. 1 illustrates, in block diagram form, an illustrative embodiment of the invention.

FIG. 1 illustrates central office 100 for implementing the invention. Central office 100 includes control processor 102 which provides over control of central office 100, switching network 101 that provides all of the necessary switching and interface functions for central office 100, and voice synthesizer 103 that provides the voice announcements for the advertisements. Central office 100 may advantageously be the Lucent Technologies 4 ESS® telephone switching system. However, voice synthesizer 103 has greater message capacity than found in a standard 4 ESS switching system. Central office 100 is interconnected to public switching network 104 via trunks 108. Central office 100 provides service to its customers via terminal sets 106–107. One skilled in the art could readily see that the functions provided with respect to the invention by central office 100 could also be provided by a switching office within the long distance network that is part of public switching network 104. It is possible to insert advertisements during the setup time for a call despite the advances in switching/signaling technology. Because of the emergence of cellular telephones and different call coverage services provided by local public service providers, the time to set up a call can be quite long.

Consider the following example. When terminal set 106 places a call to terminal set 107, control processor 102 via switching network 101 provides a dial tone to terminal set 106 and receives dialing information defining the telephone number of terminal set 107. Upon receiving the telephone number of terminal set 107, central processor 102 performs the standard telephone switching functions to establish a call between terminal set 106 and terminal set 107 via switching network 102. These standard telephone functions include ringing terminal set 107. In accordance with the invention, control processor 102 accesses an internal table to determine what advertisement should be transmitted to terminal set 106 during the period of time before terminal set 107 answers the call or terminal set 106 abandons the call. After determining the message that should be transmitted to terminal set 106, control processor 102 requests that voice synthesizer 103 transmit this message to switching network 101, and control processor 102 properly sets up a connection from voice synthesizer 103 to terminal set 106. Advantageously, voice synthesizer 103 has a plurality of links to switching network 101 and can be simultaneously transmitting a plurality of messages via switching network 101 to terminal sets connected to central office 100. While the message is being transmitted from voice synthesizer 103 to terminal set 106, control processor 102 utilizing well known techniques connects a voice recognition circuit or a multi-frequency detector circuit, both of which are part of switching network 101 to the connection with terminal set 106. The purpose of these circuits is to detect a positive response of the customer utilizing terminal set 106 to receive additional information concerning the advertisement when the call to terminal set 107 is abandoned. The call may either be abandoned because terminal set 107 fails to answer the call or after the call has been answered and the parties are finished with the telephone conversation. If the customer using terminal set 106 indicated during the advertisement that they wished additional information, after the telephone call has been abandoned, control processor 102 places a call to terminal set 106 and terminates this call either to call center 109 designated by the advertiser via switching network 101 and public switching network 104 or provide an additional detailed message via voice synthesizer 103.

For example, if the original advertisement stated "If you want to refinance your home, press 1 or say yes", control processor 102 transfers a subsequent call set up to terminal set 106 to call center 109 of the advertiser who would normally be a mortgage company. In a second example, if the message stated "Would you like to go to Joe's Truck Stop for dinner, press 1 or say yes", control processor 102 would instruct a voice synthesizer 103 to play out additional information concerning Joe's Truck Stop to terminal set 106 after the abandonment of the call between terminal sets 106 and 107.

Advantageously, there would be a plurality of advertisements that could be played at any one time to a given class of customers or an individual customer. Control processor 102 utilizes an algorithm so that the same advertisement is not continuously repeated to an individual customer each time that customer places a telephone call. Further, the owner of central office 100 would be paid a fee for each advertisement that was played during a call origination and an additional fee for each time that a customer wished to gain additional information concerning the advertisement. In addition, there would be a varying fee schedule based on the time of day and day of week that the advertisement was transmitted.

Figure 2:
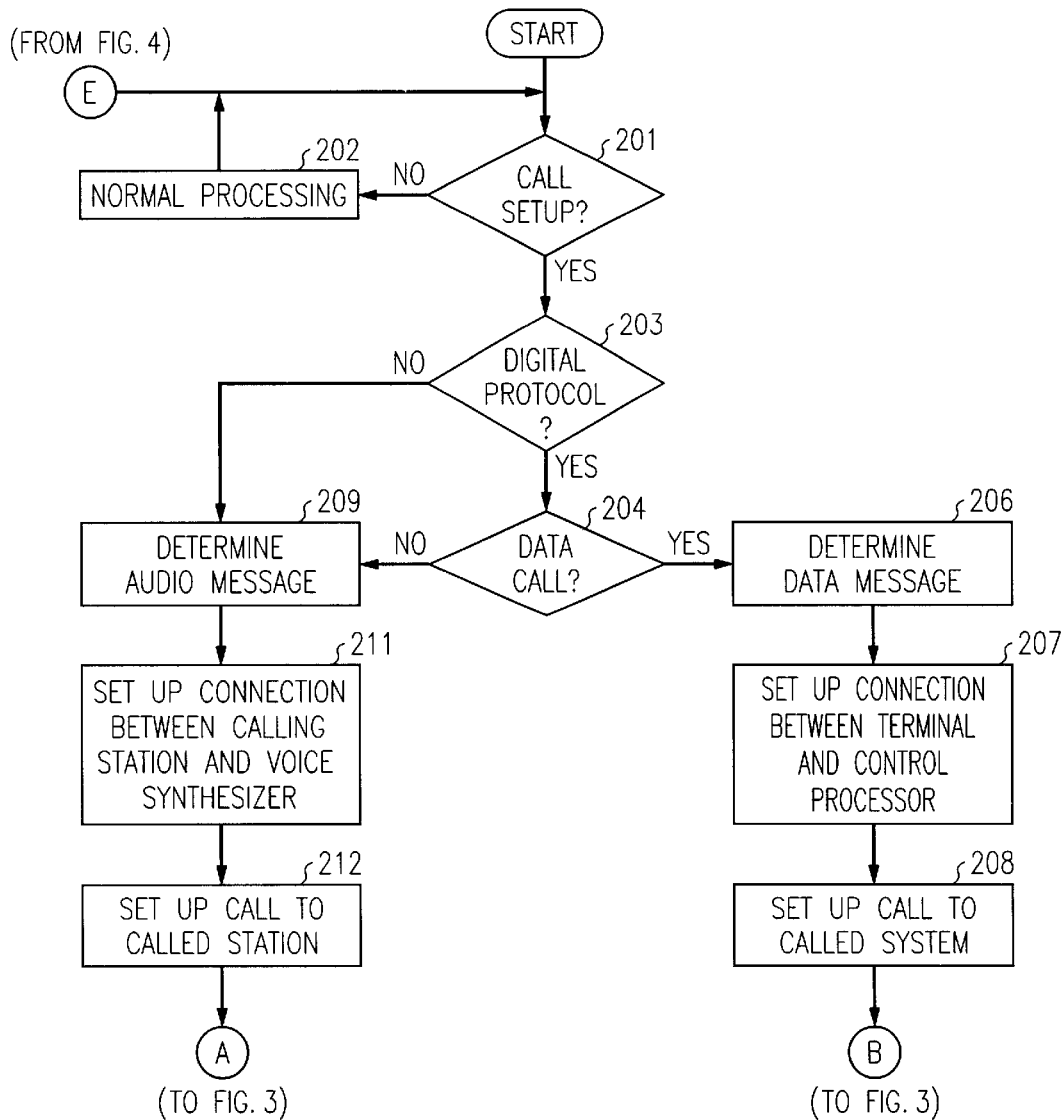
FIGS. 2–4 illustrate, in flowchart form, the steps performed by a switching system in implementing the embodiment of the invention.
Figure 3:
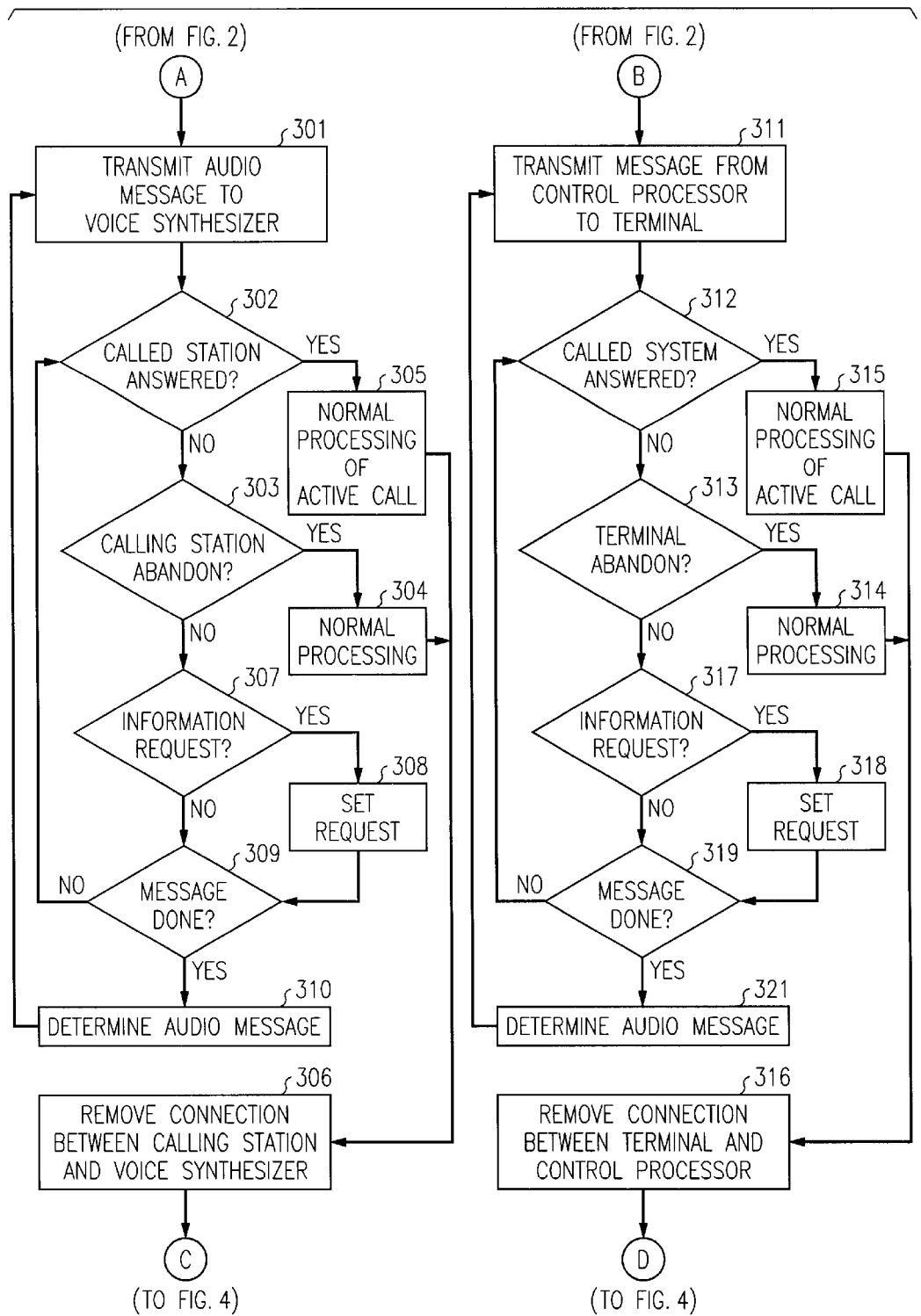
Figure 4:
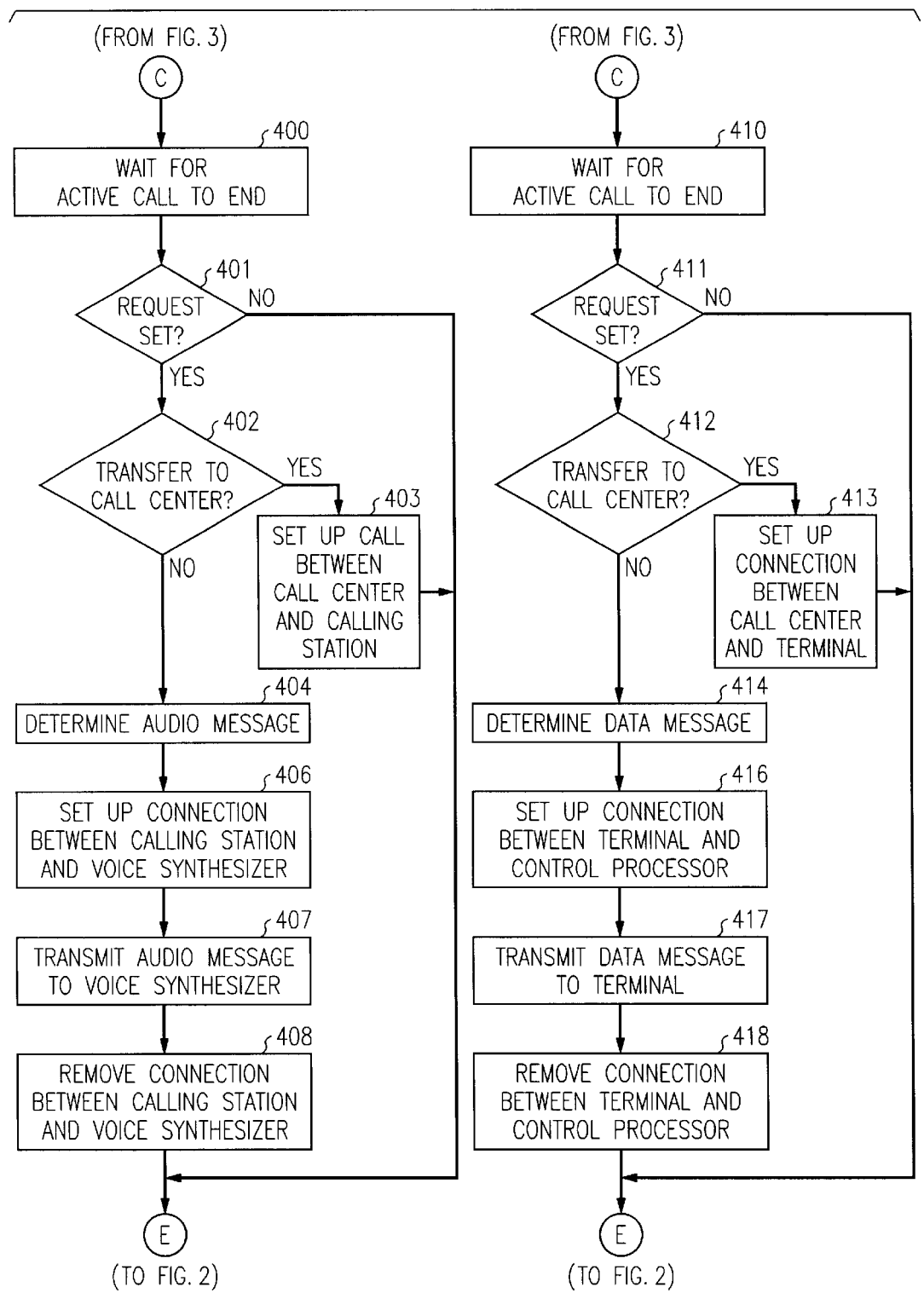

FIGS. 2–4 illustrate, in flowchart form, the steps implemented by control processor 102 in implementing an embodiment of the invention. In FIG. 2, once execution is started, decision block 201 determines if a call setup message has been received from a station set or a terminal. If the answer is no, block 202 performs normal processing before returning control back to decision block 201. If the answer in decision block 201 is yes, decision block 203 determines if the setup request is an analog or digital protocol request. If the answer in decision block 203 is no, control is transferred to block 209 which determines the audio message that is to be transmitted to the station set. Block 209 will also perform the necessary operations of assuring that the customer does not constantly repeatedly hear the same advertisement. After execution of block 209, block 211 sets up a connection between the calling station and voice synthesizer 103. After execution of block 211, block 212 commences the process of setting up a call to the called station as designated by the calling station before transferring control to block 301 of FIG. 3.

Block 301 transmits the audio message to voice synthesizer 103 before transferring control to decision block 302. Upon receiving the audio message, the voice synthesizer transmits this message to switching network 101. The audio message also specifies to which port of switching network 101 voice synthesizer 103 is to transmit the message. While the message is being communicated to the calling station, decision block 302 determines if the called station has answered the call setup. If the answer is yes, control is transferred to block 305 which performs normal processing of an active call before transferring control to block 306. Block 306 removes the connection between the calling station and the voice synthesizer before transferring control to decision block 400 of FIG. 4. If the answer in decision block 302 is no, control is transferred to decision block 303 which determines if the calling station has abandoned the call. If the answer is yes, control is transferred to block 304 which performs normal processing of an abandoned call before transferring control to block 306 whose activity has already been described. Returning to decision block 303, if the calling station has not abandoned the call, control is transferred to decision block 307.

Decision block 307 determines if during the receipt of the message from the voice synthesizer the calling party has indicated that they wish to receive additional information concerning the advertisement. If the answer is yes, block 308 sets a request flag before transferring control to decision block 309. If the answer in decision block 307 is no, control is also transferred to decision block 309. Decision block 309 determines if the audio message has been completely played to the calling party. If the answer is no, control is transferred back to decision block 302. If the answer in decision block 309 is yes, control is transferred back to block 310 which determines a new audio message before transferring control back to block 301.

Returning to block 306 from which control is transferred to decision block 400 of FIG. 4 which waits for the end of an answered call before transferring control to decision block 401. When control is transferred to decision block 401, the called party has answered the call or the calling party has abandoned the call. Decision block 401 determines if the request flag was set by the calling party while the advertisement was being played. If the answer is no, control is transferred back to decision block 201 of FIG. 2. If the answer in decision block 401 is yes, decision block 402 determines if control processor 102 is to play additional information to the calling station via voice synthesizer 103 or if the calling station set is to be connected to a call center. If the calling station set is to be connected to a call center, decision block transfers control to block 403 that sets up a call between the designated call center and the calling station before transferring control back to decision block 201 of FIG. 2. If the answer in decision block 402 is no, control is transferred to block 404.

Block 404 determines the audio message that is to give additional information to the calling party concerning the advertisement. Block 406 then sets up a connection between the calling station and the voice synthesizer before transferring control to block 407. The latter block transmits the audio message to the voice synthesizer which plays the message to the calling station set. After the message has been played to the calling station set, block 408 removes the connection between the calling station and the voice synthesizer before returning control back to decision block 201 of FIG. 2. One skilled in the art would readily envision that block 406 determines when the calling station had responded to the setup of the connection before transferring control to block 407.

Returning to decision block 203 of FIG. 2, if a digital protocol is used to initiate the call setup, control is transferred to decision block 204 to determine if a voice or data call is being set up. In a digital protocol such as the ISDN protocol or the DSL protocol the setup message defines whether a voice or data call is being set up. If a voice call is being set up, control is transferred to block 209 whose operations have already been described. If a data call is being set up, control is transferred to block 206. The latter block determines the data message that is to be transmitted by control processor 102 to the terminal via switching network 101. Block 207 sets up a connection to the terminal. This may be a circuit switched or a packet connection as is well-known by those skilled in the art. After the connection has been set up, block 208 starts the process of setting up a call to the called system to which the calling terminal is to be connected before transferring control to block 311 of FIG. 3.

Block 311 starts the transmission of the data message to the terminal from the control processor. The data message may be text only or may be a multi-media message consisting of video and sound. After execution of block 311, control is transferred to decision block 312. The latter decision block determines if the called system has answered. If the answer is yes, control is transferred to block 315 which performs normal processing of an answered call before transferring control to block 316. Block 316 removes the connection between the terminal and the control processor before transferring control to decision block 410 of FIG. 4. Returning to decision block 312, if the answer is no, decision block 313 determines if the terminal has abandoned the call setup. If the answer is yes in decision block 313, control is transferred to block 314 which performs the normal processing for an abandoned call before transferring control to block 316 whose activity has already been described. Returning to decision block 313, if the answer is no, control is transferred to decision block 317. Decision block 317 determines if the user of the terminal has indicated that they want to obtain more information on the advertisement. If the answer is yes, control is transferred to block 318 which sets the request flag before transferring control to decision block 319. If the answer in decision block 317 is yes, control is transferred to block 319. The latter block determines if the data message is done. If the answer is no, control is transferred to decision block 312. If the answer is yes, control is transferred to block 321 which determines a new message before transferring control to block 311.

When control is transferred from block 316 to decision block 410 of FIG. 4 which waits for the end of answered call before transferring control to decision block 411. Decision block 411 determines if the request flag has been set indicating that the user of the terminal wishes to receive additional information. If the answer is no, control is transferred to decision block 201 of FIG. 2. If the answer is yes, control is transferred to decision block 412 which determines if the additional information is to be transmitted from the central processor or is to be received from a call center. If the additional information is to be received from a call center, control is transferred to block 413 which sets up a digital connection between the call center and the terminal, before transferring control back to decision block 201 of FIG. 2. One skilled in the art could readily envision that a digital connection could be set up between the terminal and an Internet web site rather than a call center. If the answer in decision block 412 is no, block 414 determines what the data message should be transmitted before transferring control to block 416. The later block sets up a connection between the terminal and the control processor. Then, block 417 transmits the data message to the terminal before transferring control to block 418. Block 418 removes the connection between the terminal and the control processor and transfers control back to decision block 201 of FIG. 2.

Of course, various changes and modification to the illustrative embodiments described above will be apparent to those skilled in the art. Such changes and modifications can be made without departing from the spirit and scope of the invention and without diminishing its intended advantages. It is therefore intended that such changes and modifications be covered by the following claims except insofar as limited by the prior art.

What is claimed is:

1. A method of transmitting advertisement messages to a telecommunication terminals during call setup by a telecommunication switching system, comprising the steps of:

detecting call origination by a calling telecommunication terminal to a called telecommunication terminal;

placing a call between the calling telecommunication terminal and the called telecommunication terminal by setting up a communication path through the telecommunication switching system;

determining a first one of the advertisement messages to be transmitted to the calling telecommunication terminal;

setting up communication path between a message transmission unit and the calling telecommunication terminal;

transmitting the determined first one of the advertisement messages to the calling telecommunication terminal via the communication path by the message transmission unit;

transmitting alerting to the called telecommunication terminal upon the call to the called telecommunication terminal being set up through the telecommunication switching system;

terminating the determined first one of the advertisement messages upon the called telecommunication terminal answering the call;

detecting an indication from the calling telecommunication terminal for additional information concerning the determined first one of the advertisement messages during the placing and alerting steps;

determining a third message concerning the determined first one of the advertisement messages upon completion of a call between the calling telecommunication terminal and called telecommunication terminal;

resetting up the communication path between the message transmission unit and the calling telecommunication terminal by the telecommunication switching system in response to the detected indication without additional stimulus from the calling telecommunication terminal and completion of the call between the calling telecommunication terminal and called telecommunication terminal; and transmitting the determined third message to the calling telecommunication terminal via the communication path by the message transmission unit upon completion of the call between the calling telecommunication terminal and called telecommunication terminal.

2. The method of claim 1 further comprises the step of detecting completion of transmission of the determined one of the advertisement messages to the calling telecommunication terminal;

the determining step further determining a second one of the advertisement messages; and the transmitting step further transmitting the determined second one of the advertisement messages to the calling telecommunication terminal via the communication path by the message transmission unit.

3. The method of claim 1 wherein the message transmission unit is a control processor of the telecommunication switching network.

4. The method of claim 2 wherein the advertisement messages are text messages.

5. The method of claim 4 wherein the message transmission unit is a voice synthesizer.

6. The method of claim 5 wherein the advertisement messages are voice messages.

7. An apparatus for performing the method of claim 1.

8. A method of transmitting advertisement messages to a telecommunication terminals during call setup by a telecommunication switching system, comprising the steps of:

detecting call origination from a calling telecommunication terminal to a called telecommunication terminal;

placing a call between the calling telecommunication terminal and the called telecommunication terminal by setting up a communication path through the telecommunication switching system;

determining a first one of the advertisement message to be transmitted to the calling telecommunication terminal;

setting up communication path between a message transmission unit and the calling telecommunication terminal;

transmitting the determined first one of the advertisement messages to the calling telecommunication terminal via the communication path by the message transmission unit;

transmitting alerting to the called telecommunication terminal upon the call to the called telecommunication terminal being set up through the telecommunication switching system;

terminating the determined first one of the advertisement messages upon the called telecommunication terminal answering the call;

detecting an indication from the calling telecommunication terminal for additional information concerning the determined first one of the advertisement messages;

determining a third message concerning the determined first one of the advertisement messages upon abandonment of the call origination by the calling telecommunication terminal;

resetting up the communication path between the messagetransmission unit and the calling telecommunication terminal by the telecommunication switching system in response to the detected indication and abandonment of the call origination by the calling telecommunication terminal without additional stimulus from the calling telecommunication transmitting the determined third message to the calling telecommunication terminal via the communication path by the message transmission unit upon abandonment of the call origination by the calling telecommunication terminal.

9. An apparatus for performing the method of claim 1.

10. A method of transmitting advertisement messages to a telecommunication terminals during call setup by a telecommunication switching system, comprising the steps of:

detecting call origination from a calling telecommunication terminal to a called telecommunication terminal;

placing a call between the calling telecommunications terminal and the called telecommunication terminal by setting up a communication path through the telecommunication switching system;

determining a first one of the advertisement messages to be transmitted to the calling telecommunication terminal;

setting up communication path between a message transmission unit and the calling telecommunication terminal;

transmitting the determined first one of the advertisement messages to the calling telecommunication terminal via the communication path by the message transmission unit;

transmitting alerting to the called telecommunication terminal upon the call to the called telecommunication terminal being set up through the telecommunication switching system;

terminating the determined first one of the advertisement messages upon the called telecommunication terminal answering the call;

detecting an indication from the calling telecommunication terminal for additional Information concerning the determined first one of the advertisement messages;

determining a third message concerning the determined first one of the advertisement messages upon abandonment of the call origination by the calling telecommunication terminal;

detecting an indication from the calling telecommunication terminal for additional information concerning the determined first one of the advertisement messages;

establishing a second call between the calling telecommunication terminal and a call center system by the telecommunication switching system in response to the detected indication without additional stimulus from the calling telecommunication terminal and the completion of a first call between the calling telecommunication terminal and called telecommunication terminal; and communicating additional information to the calling telecommunication terminal by the call center system upon the completion of the first call between the calling telecommunication terminal and called telecommunication terminal.

11. A method of transmitting advertisement messages to a telecommunication terminals during call setup by a telecommunication switching system, comprising the steps of:

detecting call origination from a calling telecommunication terminal to a called telecommunication terminal;

placing a call between the calling telecommunication terminal and the called telecommunication terminal by setting up a communication path through the telecommunication switching system;

determining a first one of the advertisement messages to be transmitted to the calling telecommunication terminal;

setting up communication path between a message transmission unit and the calling telecommunication terminal;

transmitting the determined first one of the advertisement messages to the calling telecommunication terminal via the communication path by the message transmission unit;

transmitting alerting to the called telecommunication terminal upon the call to the called telecommunication terminal being set up through the telecommunication switching system;

terminating the determined first one of the advertisement messages upon the called telecommunication terminal answering the call;

detecting an indication from the calling telecommunication terminal for additional information concerning the determined first one of the advertisement messages;

determining a third message concerning the determined first one of the advertisement messages upon abandonment of the call origination by the calling telecommunication terminal;

detecting an indication from the calling telecommunication terminal for additional information concerning the determined first one of the advertisement messages;

establishing a call between the calling telecommunication terminal and a call center system by the telecommunication switching system in response to the detected indication and abandonment of the call origination by the calling telecommunication terminal without additional stimulus from the calling telecommunication terminal; and communicating additional information to the calling telecommunication terminal by the call center system upon abandonment of the call origination by the calling telecommunication terminal.

* * * * *